United States Patent [19]

Rotondo

[11] Patent Number: 5,016,919
[45] Date of Patent: May 21, 1991

[54] CHECK AND MAGNETIC STRIP ARRANGEMENT

[76] Inventor: Frank Rotondo, c/o Vito Sciancalepore, 435 60th St., West New York, N.J. 07093

[21] Appl. No.: 321,712

[22] Filed: Mar. 10, 1989

[51] Int. Cl.⁵ .................................... B42D 15/00
[52] U.S. Cl. .................................... 283/82; 283/58
[58] Field of Search ............ 283/82, 57, 58, 59, 283/901, 72; 235/493, 494, 379, 380; 40/299

[56] References Cited

U.S. PATENT DOCUMENTS

| | | | |
|---|---|---|---|
| 1,052,865 | 2/1913 | Ward | 283/901 |
| 1,336,647 | 4/1920 | Miller | 283/901 |
| 1,567,613 | 12/1925 | Patton | 283/58 |
| 3,282,210 | 11/1966 | Weig | 283/57 |
| 4,315,246 | 2/1982 | Milford | 382/17 |
| 4,428,997 | 1/1984 | Shulman | 283/901 |
| 4,588,211 | 5/1986 | Greene | 283/901 X |
| 4,602,151 | 7/1986 | Hellsberg | 235/383 |
| 4,620,727 | 11/1986 | Stockburger et al. | 283/82 |
| 4,658,125 | 4/1987 | Kachi et al. | 235/449 |
| 4,684,795 | 8/1987 | Colgate, Jr. | 156/240 |
| 4,692,602 | 9/1987 | Conant | 235/449 |
| 4,795,895 | 1/1989 | Hara et al. | 283/904 X |

Primary Examiner—Frank T. Yost
Assistant Examiner—Y. Lin
Attorney, Agent, or Firm—Leon Gilden

[57] ABSTRACT

A check and magnetic strip arrangement is set forth wherein a negotiable instrument comprising a check is arranged with a first magnetic strip positioned adjacent a right edge on a rear face of the check forwardly of a signature line on a forward face of the check with a second magnetic strip of equal information positioned underlying the signature line adjacent the bottom edge of the check on a rear face of the check orthogonally relative to the first magnetic strip. The second magnetic strip is positioned to extend from the right edge of the check to an orientation somewhat medially of the check to provide adequate spacing for endorsement of the check on the rear face of the check along the left edge thereof.

1 Claim, 1 Drawing Sheet

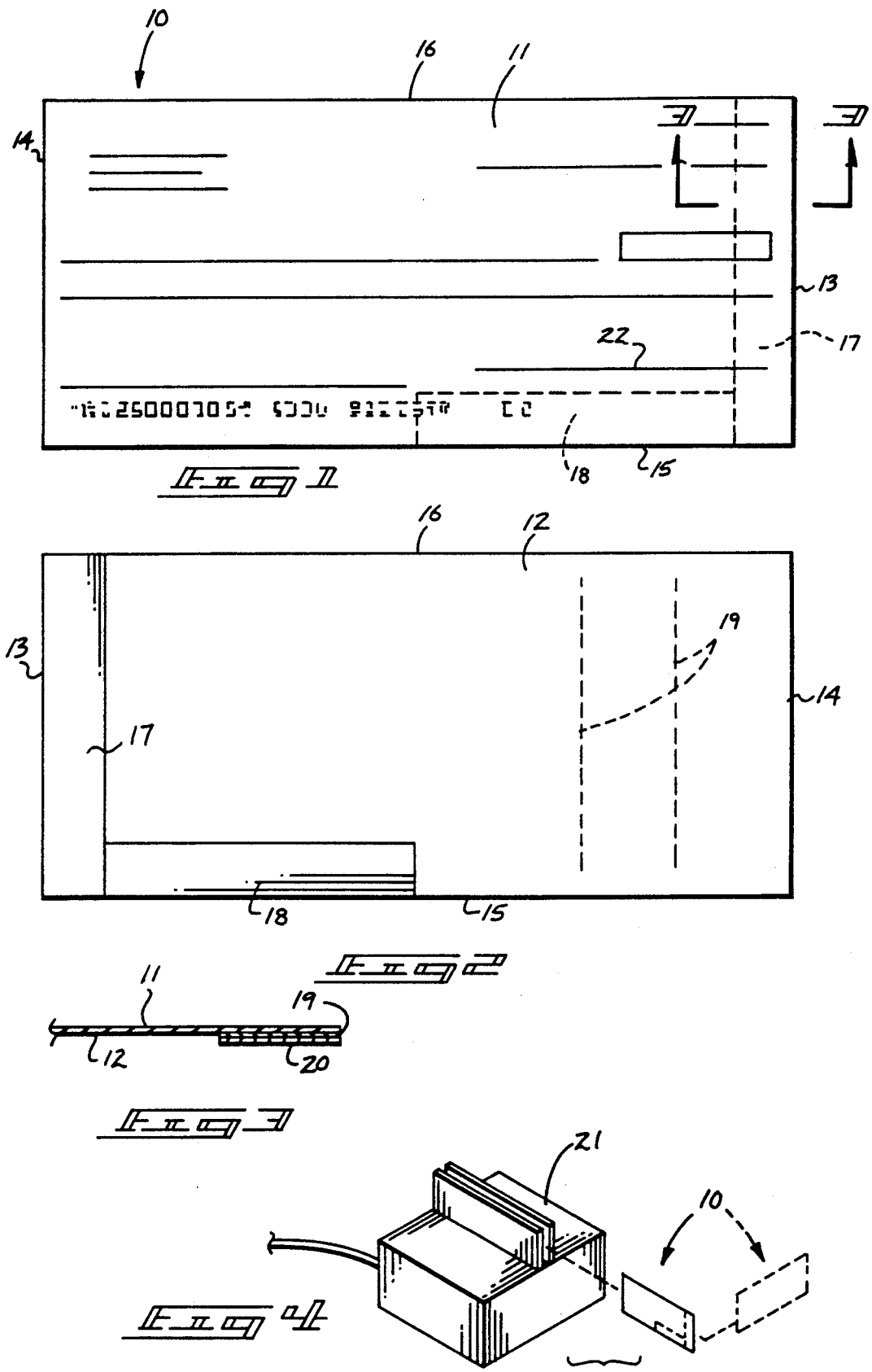

CHECK AND MAGNETIC STRIP ARRANGEMENT

BACKGROUND OF THE INVENTION

1. Field of the Invention

The field of invention relates to negotiable instruments, and more particularly pertains to a new and improved check including intersecting magnetic strips positioned along intersecting edges of a check to provide duplicate information as a backup system of one magnetic strip for the other and enabling the check to register information lengthwise and edgewise when the check is directed through a magnetic strip reading device.

2. Description of the Prior Art

The use of magnetic information imprinted upon various articles for their subsequent detection and reading by various devices, such as readers arranged for the detection or reading of magnetic strip borne upon cards and the imprinted numbers upon checks, is known in the prior art. Heretofore, however, the prior art has failed to provide backup systems for information upon such items as checks and the like and have not failed to properly arrange this information in a manner to avoid damage by endorsement and signature of a negotiable instrument, such as a check. For example, U.S. Pat. No. 4,315,246 to Milford sets forth the detection and reading of magnetic ink characters on a document to be directed through a reader/sorter.

U.S. Pat. No. 4,658,125 to Kachi sets forth a coupon utilizing magnetic ink arranged in a row at predetermined intervals to provide data to be read during a deposit through and past magnetic heads for sorting and reading of the associated coupon.

U.S. Pat. No. 4,684,795 to Colgate sets forth an identification card and means of manufacturing the identification card with a particular arrangement of a magnetic strip thereon in a single orientation about a face of the card.

U.S. Pat. No. 4,692,602 to Conant sets forth a reader to accommodate various thicknesses of checks, cards, and passports to provide a means of reading various instruments through a single reader.

U.S. Pat. No. 4,602,151 to Hellsberg sets forth a tag reading device wherein tags, such as utilized in identifying articles or garments within a store, are directed through a reader which will then direct this information onto a cash register wherein the tags are provided with printed points rather than code-apertures.

As such, it may be appreciated that there is a continuing need for a new and improved check and magnetic strip arrangement wherein the same provides for a backup arrangement of information on a check and further orients the information remote from damage in use of the negotiable instrument.

SUMMARY OF THE INVENTION

In view of the foregoing disadvantages inherent in the known types of negotiable instruments now present in the prior art, the present invention provides a check and magnetic strip arrangement wherein the same provides for a backup system for providing duplicate information and orienting such information remote from signature and endorsement portions of the check. As such, the general purpose of the present invention, which will be described subsequently in greater detail, is to provide a new and improved check and magnetic strip arrangement which has all the advantages of the prior art negotiable instruments and none of the disadvantages.

To attain this, the present invention comprises a check formed with a forward and rearward surface with a first and second magnetic strip positioned adjacent bottom and right side edges of the check along a rear surface of the check removed from a signature and endorsement portion of the check wherein the strips provide duplicate information to enable the check to be directed through a magnetic reading instrument, either lengthwise or edgewise.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important feature of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved check and magnetic strip arrangement which has all the advantages of the prior art negotiable instruments and none of the disadvantages.

It is another object of the present invention to provide a new and improved check and magnetic strip arrangement which may be easily and efficiently manufactured and marketed.

It is a further object of the present invention to provide a new and improved check and magnetic strip arrangement which is of a durable and reliable construction.

An even further object of the present invention is to provide a new and improved check and magnetic strip arrangement which is susceptible of a low cost of manufacture with regard to both materials and labor, and which accordingly is then susceptible of low prices of sale to the consuming public, thereby making such check and magnetic strip arrangement economically available to the buying public.

Still yet another object of the present invention is to provide a new and improved check and magnetic strip arrangement which provides in the apparatuses and methods of the prior art some of the advantages thereof, while simultaneously overcoming some of the disadvantages normally associated therewith.

Still another object of the present invention is to provide a new and improved check and magnetic strip arrangement providing duplicate information on a rear surface of a check to enable the check to be directed through a magnetic reading machine lengthwise and edgewise therethrough and providing backup information, each removed from signature and endorsement portions of the check.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation of the frontal surface of the check.

FIG. 2 is an orthographic view taken in elevation of the rear surface of the check.

FIG. 3 is an orthographic view taken along the lines 3—3 of FIG. 1 in the direction indicated by the arrows.

FIG. 4 is an isometric illustration of the check of the instant invention directed through a magnetic tape reading instrument.

DESCRIPTION OF THE PREFERRED EMBODIMENT

With reference now to the drawings, and in particular to FIGS. 1 to 4 thereof, a new and improved check and magnetic strip arrangement embodying the principles and concepts of the present invention and generally designated by the reference numeral 10 will be described.

More specifically, it will be noted that the check and magnetic strip arrangement 10 essentially comprises a negotiable instrument formed of paper or other suitable flexible material with a forward face 11, a rear face 12, a right side edge 13, a left side edge 14, a bottom edge 15, and a top edge 16, as viewed from the forward face of FIG. 1. The forward face 11 contains the typical endorsement aspects of a written check including a signature endorsement line 22 and a rear endorsement line 19 spaced interiorly of the rear face 12 of the check from the left side edge 14. The signature endorsement line 22 is spaced above the bottom edge 15 and interiorly of the forward face 11 from the right side edge 13.

Positioned on the rear face 12 is a first magnetic strip 17 spaced coextensively adjacent the right side edge 13 with an intersecting second magnetic strip 18 including duplicate information formed within the first magnetic strip 17 and spaced along the bottom edge 15 and extending to a position medially of the rear face 12. The positioning of the first and second magnetic strips 17 and 18 is important in that the first and second magnetic strips are positioned strategically to avoid destruction thereof in the use of the check. The first magnetic strip 17 is spaced remotely from the signature endorsement line 22 along the forward face of the check and at the opposite side edge to the rear endorsement lines 19 spaced adjacent the left side edge 14, as required lines 19 spaced adjacent the left side edge 14, as required in the endorsement of checks, wherein it may be noted in FIG. 1 that the second magnetic strip 18 is spaced underlying the signature endorsement line 22 and in its position remote from the rear endorsement lines 19, avoids destruction of information within the magnetic strip by its positioning.

Reference to FIG. 3 illustrates the first magnetic strip 17 positioned with a clear scuff coating 20 maintaining the integrity of information on the magnetic strip.

Reference to FIG. 4 illustrates that the check of the instant invention may be directed through a magnetic character reading device 21, either lengthwise or edgewise, as illustrated by the solid and respective phantom configuration of the instant invention. Further, this enables the negotiable instrument to be checked against itself as it is directed through the reading device in either a lengthwise or edgewise orientation.

As to the manner of useage and operation of the instant invention therefore, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A negotiable instrument comprising a check including, in combination, a forward face is defined overlying a rear face wherein said forward face is further defined by a right side edge, a left side edge, a top edge, and a bottom edge, and said forward face includes a first signature endorsement line spaced above said bottom edge and adjacent the right side edge, and the rear face includes a second signature line spaced adjacent the left side edge, and a magnetic strip means is integrally secured to said rear face for storing information regarding the negotiable instrument, and wherein said magnetic strip means includes a first magnetic strip positioned coextensively with the right side edge intersecting a second magnetic strip positioned adjacent the bottom edge underlying the first signature endorsement line, and wherein the first magnetic strip is spaced adjacent the right side edge spaced from the first and second signature endorsement lines, and wherein the second magnetic strip extends along the bottom edge to a position substantially medially of the length of the bottom edge to space the first and second magnetic strips from the first signature endorsement line, and wherein the first and second magnetic strips each includes a scuff coat to protect the first and second magnetic strips from debris, and wherein the first and second magnetic strips include identical information to provide backup information on the negotiable instrument and enable directing either the bottom edge or the right side edge through a magnetic strip reading device.

* * * * *